(12) United States Patent
Mitchell et al.

(10) Patent No.: US 7,870,778 B2
(45) Date of Patent: Jan. 18, 2011

(54) METHOD AND APPARATUS FOR ESTIMATING ENGINE POWER

(75) Inventors: Bradley J. Mitchell, Snohomish, WA (US); Trevor M. Laib, Woodinville, WA (US); Henry V. R. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 12/137,189

(22) Filed: Jun. 11, 2008

(65) Prior Publication Data

US 2009/0314069 A1    Dec. 24, 2009

(51) Int. Cl.
*G01M 15/04* (2006.01)
(52) U.S. Cl. .................. 73/114.13; 73/114.69
(58) Field of Classification Search .............. 73/114.13, 73/114.69
See application file for complete search history.

(56) References Cited

U.S. PATENT DOCUMENTS

| | | | | |
|---|---|---|---|---|
| 3,603,155 A | * | 9/1971 | Morris et al. ............ 73/863.01 |
| 4,160,373 A | * | 7/1979 | Fastaia et al. ............ 73/23.31 |
| 5,129,258 A | * | 7/1992 | Homeyer ................ 73/114.73 |
| 5,600,948 A | * | 2/1997 | Nakajima et al. ............ 60/276 |
| 5,605,040 A | * | 2/1997 | Cullen et al. ................ 60/274 |
| 6,085,582 A | * | 7/2000 | Tripathi et al. ........... 73/114.71 |
| 6,112,575 A | * | 9/2000 | Cocconi .................... 73/23.31 |
| 6,387,706 B1 | * | 5/2002 | Eden ......................... 436/127 |
| 7,007,458 B2 | * | 3/2006 | Mazur et al. ................. 60/277 |
| 2009/0312899 A1 | | 12/2009 | Mitchell et al. |

* cited by examiner

*Primary Examiner*—Freddie Kirkland, III
(74) *Attorney, Agent, or Firm*—Yee & Associates, P.C.; Dennis R. Plank

(57) ABSTRACT

A method is present for estimating engine load factor. Temperature data is obtained from a temperature sensor in a location with respect to an exhaust system for an engine. A rate of temperature change is estimated using the temperature data. A steady state temperature at a selected time is calculated for the location using the temperature data and the rate of temperature change. The engine load factor at the selected time is estimated from the steady state temperature.

16 Claims, 8 Drawing Sheets

METHOD AND APPARATUS FOR ESTIMATING ENGINE POWER

BACKGROUND INFORMATION

1. Field

The present disclosure relates generally to monitoring vehicles and equipment and in particular to monitoring operations of vehicles and equipment. Still more particularly, the present disclosure relates to a method and apparatus for monitoring operations of vehicles and equipment in a facility.

2. Background

An airport is a facility at which aircraft, such as airplanes and helicopters, may operate. An airport typically includes at least one surface, such as a runway or helipad for take offs and landings. Airports often include other structures. These structures may include, for example, hangers and terminal buildings.

In performing operations for air traffic, different vehicles may be used to provide support for these operations. These support vehicles may include, for example, mobile air conditioning vehicles, cargo transportation vehicles, shuttle buses, fuel trucks, fire trucks, deicing vehicles, catering vehicles, push back tugs, baggage loaders, and other suitable vehicles. These vehicles may be involved in ground power operations, aircraft mobility, loading operations, and other suitable operations to support aircraft flights The different operations performed at an airport, keep traffic moving both in the air and on the surface. The operations also may be a source of noise and air pollution. These types of pollution and their effect on the environment are of concern. Airports may generate environmental reports to show how they consider environmental concerns, and how they protect the environment from airport operations in various airport management reports. These reports may include, for example, environmental protection measures that are put in place by the airport. These measures may include ones to reduce water, air, soil, and noise pollution.

One area of particular concern with respect to pollution at airports is the production of green house gas emissions. Emissions of interest with respect to the environment may include the emission of carbon dioxide and nitrogen oxide generated by airport operations. One source of these types of emissions includes support vehicles at the airport.

Currently, these types of emissions are estimated using manufacture's specifications. Current methodologies for identifying emissions use the total fuel consumption and the manufacturer's specifications to identify emissions generated by vehicles over a selected period of time, such as a year. The granularity of these estimates may be set based on the granularity at which fuel consumption estimates can be obtained. The fuel consumption is currently identified from fuel purchase reports.

These types of reports provide a monthly or yearly amount of fuel purchased for use by support vehicles. These types of reports do not provide information of sufficient granularity to reveal specific use patterns of specific vehicles or equipment that might be useful in discovering emission reduction opportunities.

Therefore, it would be advantageous to have a method and apparatus for identifying emissions of vehicles at a facility that overcomes the problems described above.

SUMMARY

In one advantageous embodiment, a method is present for estimating engine load factor. Temperature data is obtained from a temperature sensor in a location with respect to an exhaust system for an engine. A rate of temperature change is estimated using the temperature data. A steady state temperature at a selected time is calculated for the location using the temperature data and the rate of temperature change. The engine load factor at the selected time is estimated from the calculated steady state temperature.

In another advantageous embodiment, a method is present for estimating engine load factor. Temperature data is obtained for a location with respect to an exhaust system for an engine. A rate of temperature change is estimated using the temperature data. A steady state temperature at a selected time is calculated for the location using the temperature data and the rate of temperature change. The engine load factor at the selected time is estimated from the steady state temperature.

In yet another advantageous embodiment, an apparatus is present comprising a temperature sensor, a computer, and program code. The temperature sensor is capable of being placed in a location with respect to an exhaust system for an engine. The computer executes the program code to obtain temperature data from the temperature sensor; estimate a rate of temperature change using the temperature data; calculate a steady state temperature at a selected time for the location using the temperature data and the rate of temperature change; and estimate engine load factor at the selected time from the steady state temperature.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
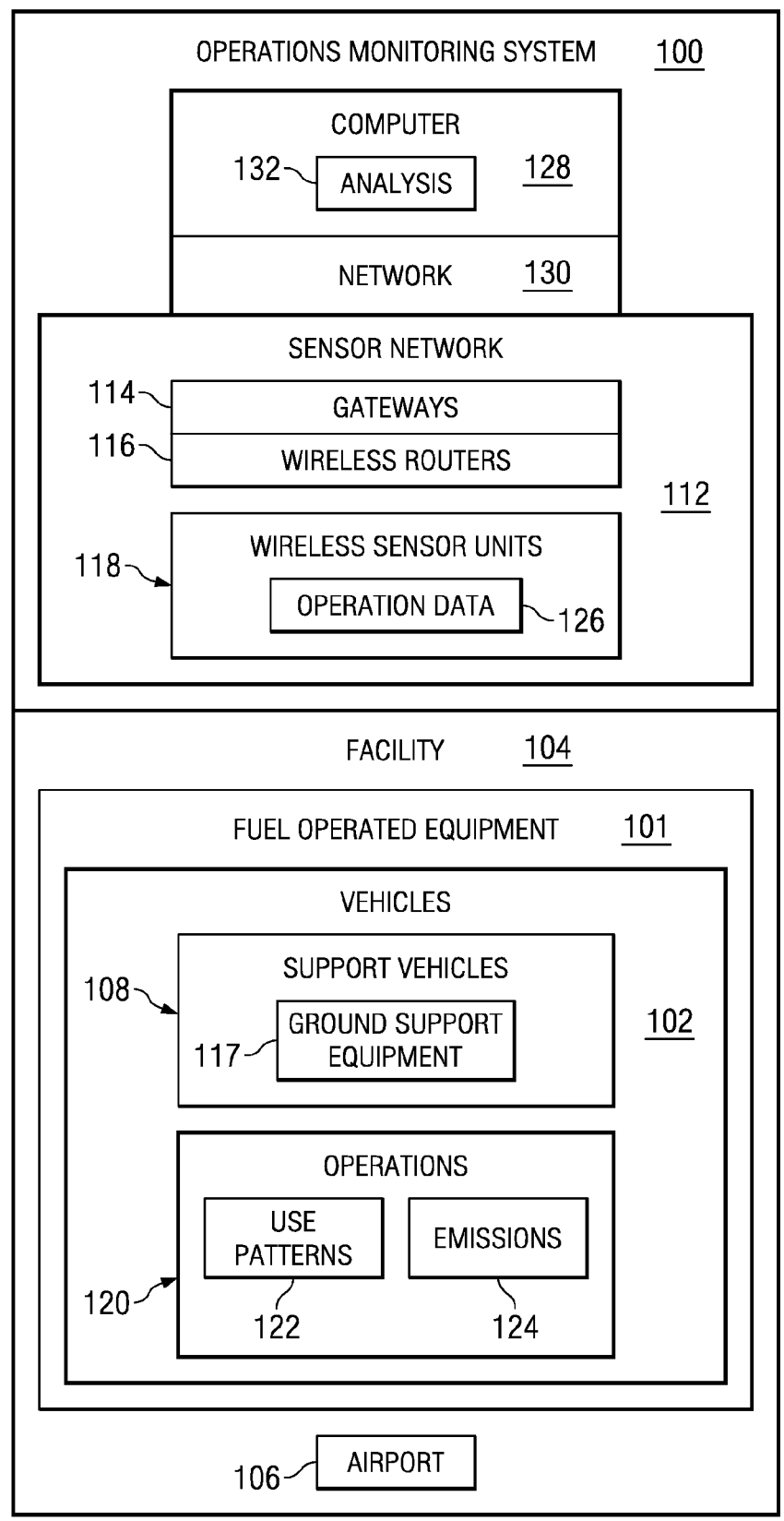
FIG. 1 is a diagram of a sensor network monitoring vehicle operations in accordance with an advantageous embodiment.

With reference now to the Figures and in particular with reference to FIG. 1, a diagram of a sensor network monitoring vehicle operations is depicted in accordance with an advantageous embodiment. In this example, operations monitoring system 100 is employed to monitor operations of fuel operated equipment 101, such as, vehicles 102, at facility 104. In these examples, facility 104 takes the form of airport 106.

Vehicles 102 may include support vehicles 108, which may take the form of ground support equipment 117. In these examples, the operations of vehicles 102 are monitored by using sensor network 112. Sensor network 112 is capable of providing real time data gathering as opposed to the currently used manual data from reports or estimates. In this example, sensor network 112 includes gateways 114, wireless routers 116, and wireless sensor units 118.

Support vehicles 108 are designed to support operations at airport 106. Ground support equipment 117 is not typically designed for on road use outside of airport 106 in these illustrative examples. Support vehicles 108 may take various forms. For example, support vehicles 108 may include, without limitation, at least one of fire trucks, shuttle buses, fuel trucks, deicing vehicles, push back tugs, catering vehicles, cargo transport vehicles, mobile air conditioning vehicles, ground power carts, and other suitable types of vehicles.

As used herein, the phrase "at least one of" when used with a list of items means that different combinations of one or more of the items may be used and only one of each item in the list is needed. For example, "at least one of item A, item B, and item C" may include, for example, without limitation, item A or item A and item B. This example also may include item A, item B, and item C or item B and item C.

In these illustrative examples, wireless sensor units 118 monitor operations 120 performed by vehicles 102. Operations 120 may include, for example, transporting cargo from a terminal to an aircraft, pushing an aircraft back away from a gate, refueling an aircraft, moving barriers, and other suitable operations.

Wireless sensor units 118 are attached to vehicles 102 in these examples. Wireless sensor units 118 may detect various physical quantities relating to use patterns 122 and emissions 124 in monitoring operations data 126 of vehicles 102. These physical quantities include, for example, exhaust temperature, current in an electrical system, ambient air temperature, location of a vehicle, and other suitable physical quantities.

In monitoring these physical quantities, wireless sensor units 118 generate operations data 126. In these examples, operations data 126 may be any data relating to the operation of vehicles 102. Operations data 126 may be signals or data generated by the sensors without processing. In other advantageous embodiments, some preprocessing may be included in generating operations data 126. An example for subset of operations data 126 is emissions data. This type of data is any data that may be used for identifying emissions generated by vehicles 102. The emissions data may include data used to derive or estimate emissions as well as direct measurements of emissions from vehicles 102. In turn, operations data 126 is transmitted wirelessly to wireless routers 116.

Wireless routers 116 route operations data 126 from one wireless router to another wireless router until gateways 114 is reached. In some embodiments, operations data 126 may be sent by wireless sensor unit in wireless sensor units 118 to gateways 114 rather than using wireless routers 116.

Gateways 114 may transmit operations data 126 to computer 128 through network 130. Network 130 may include one or more networks such as, for example, a local area network, a wide area network, an intranet, the Internet, or some other network. These networks may include both wireless and wire connections. In these examples, computer 128 and network 130 are shown as being located outside of facility 104.

Computer 128 may process operations data 126 to perform analysis 132 to identify emissions 124 in use patterns 122. From this data, an identification of emissions with respect to use patterns 122 may be identified. Further, emissions for particular vehicles within vehicles 102 also may be identified. This information may be used to generate reports that accurately reflect emissions 124 generated by vehicles 102. This information may be identified accurately for granular periods of time.

For example, emissions and patterns may be identified for time periods, such as days, hours, minutes, or some other suitable time period. This type of reporting is in contrast to the currently available systems, which only generate estimates for a fleet of vehicles based on aggregate fuel usage. With analysis 132, facility 104 may be managed. In these examples, the management may be to reduce emissions 124.

Emissions 124 may be reduced by, for example, changing use patterns 122, changing the make up of vehicles 102, changing maintenance operations for vehicles 102, identifying needed repairs for vehicles 102, and other suitable steps or operations. Further, this analysis also may be used for other purposes, such as identifying efficiency for fuel usage in operations 120.

This type of monitoring system may be easily attached to vehicles and use wireless transmissions. In this manner, impact on the infrastructure of airport 106 and the equipment may be minimized. With an identification of use patterns 122 and emissions 124, this information may be used to identify where reductions in emission may be made. For example, this information may identify that one manufacturer of a cargo transport vehicle results in less emissions than another manufacturer for the same type of usage. As a result, better selections of manufacturers or vehicles may be made.

Further, this monitoring may identify that certain vehicles may generate more emissions. This identification along with other data may identify vehicles that may need maintenance or repairs. Further, changes in repair schedules and other operations may occur based on the identification of this information. Additionally, adjustments to vehicle operating procedures or adjustments to the facility infrastructure may be initiated to reduce vehicle operation based on the identification of this information.

Moreover, with the identification of emissions data 124 over a period of time both before and after emissions reduction improvements are made, airport and/or airline operators may become able to document the quantifiable results of their emission improvement efforts.

Such documentation may enable them to demonstrate compliance to the requirements of regulatory authorities, obtain carbon offset credits, demonstrate an environment control system in compliance with ISO 14001, and earn points in programs, such as, the Leadership in Energy and Environmental Design (LEED) program by demonstrating energy performance measurement and providing emissions reduction reporting. The above may allow airport and/or airline operators to improve their public relations.

Illustration of operations monitoring system 100 in FIG. 1 is not meant to imply architectural limitations to the manner in which different advantageous embodiments may be implemented. Illustration provides functional components and examples of some components for purposes of illustrating one manner in which different advantageous embodiments may be implemented.

For example, in some advantageous embodiments, computer 128 and network 130 may be part of sensor network 112. In other advantageous embodiments, sensor network 112 may be deployed across multiple facilities rather than just facility 104. In other advantageous embodiments, other facilities may be monitored other than airport 106. Facilities, such as, for example, a trucking depot, a shipping dock, a manufacturing facility, or some other suitable facility may be monitored in which vehicles are operated.

Further, different advantageous embodiments may employ operations monitoring system 100 to monitor other types of fuel operated equipment 101 other than vehicles 102. For example, operations monitoring system 100 may monitor operations of generators, fuel powered work lights, pumps, ground power carts, and other portable equipment. In these examples, fuel operated equipment 101 may be any equipment that has an engine powered using fuel that generates emissions. The types of fuel may include, for example, gasoline, diesel, and other suitable fuels.

Figure 2:
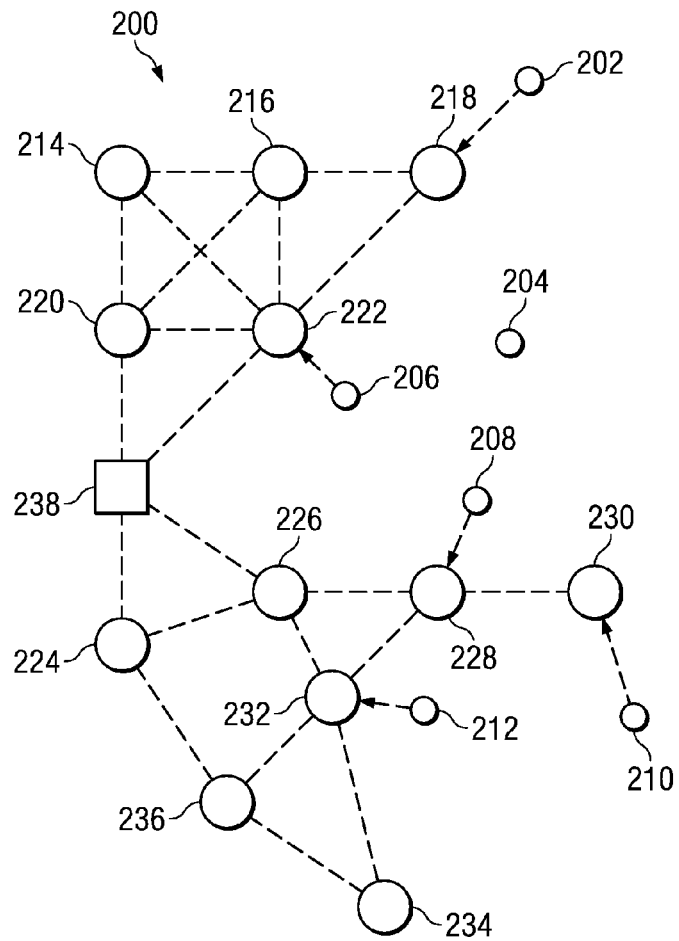
FIG. 2 is a diagram illustrating a sensor network in accordance with an advantageous embodiment.

For the purpose now of FIG. 2, a diagram illustrating a sensor network is depicted in accordance with an advantageous embodiment. In this example, sensor network 200 is an example of one implementation of sensor network 112 in FIG. 1. As illustrated, sensor network 200 includes wireless sensor units 202, 204, 206, 208, 210, and 212. These wireless sensor units are examples of wireless sensor units 118 in FIG. 1 and may be attached to support vehicles located at a facility such as airport 106 in FIG. 1. Sensor network 200 also includes wireless routers 214, 216, 218, 220, 222, 224, 226, 228, 230, 232, 234, and 236, which are examples of wireless routers 116 in FIG. 1.

These wireless routers are located in various locations at a facility. Wireless routers 214, 216, 218, 220, 222, 224, 226, 228, 230, 232, 234, and 236 route operations data detected by the different wireless sensor units towards gateway 238. In these examples, gateway 238 may be a set of gateways. A set as used herein refers to one or more items. For example, a set of gateways is one or more gateways. Gateway 238 may then send the operations data to a remote data processing system for processing. In this example, the operations data takes the form of emissions data for monitoring emissions from vehicles within a facility.

The different components in sensor network 200 are wireless components in these examples. By using wireless transmissions, the impact to operations and equipment at a facility may be minimized.

In these examples, sensor network 200 may be implemented using a number of different architectures, protocols, and/or other designs. In this particular example, sensor network 200 may be implemented using a wireless mesh network. A wireless mesh network is made up of radio nodes in which at least two pathways of communication are typically present to each node. The coverage area of the radio nodes working as a single network becomes a mesh cloud. Zigbee is an example specification of communication protocols for use in a mesh network that may be implemented in sensor network 200 in these depicted examples. This specification is available from the Zigbee Alliance.

Gateway 238 may be implemented using a Zigbee coordinator while the different routers may be implemented using Zigbee routers. The different wireless sensor units may be implemented as a Zigbee end device. A Zigbee end device contains functionality to talk to nodes such as gateway 238 or wireless router 218. A Zigbee router may act as a router passing data from other devices. A Zigbee coordinator forms the root of sensor network 200 and may provide a bridge to other networks. With this type of architecture, only a single gateway is present. Of course, with other implementations, more than one gateway may be used.

Figure 3:
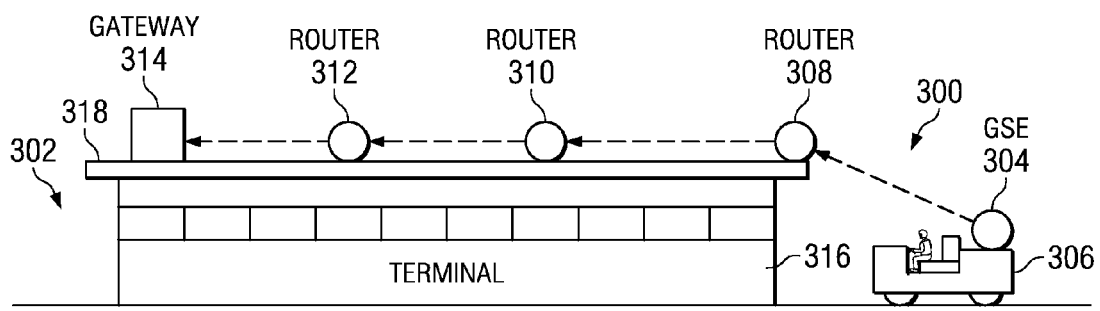
FIG. 3 is a diagram illustrating locations for components in a sensor network in accordance with an advantageous embodiment.

With reference now to FIG. 3, a diagram illustrating locations for components in a sensor network is depicted in accordance with an advantageous embodiment. In this example, sensor network 300 illustrates an example of one manner in which different components may be located or placed in a facility. Sensor network 300 also includes a gateway, which is an example of a gateway within gateways 114 in FIG. 1. Sensor network 300 shows one manner in which different components in sensor network 300 may be configured.

In this example, sensor network 300 is located at airport 302. Wireless sensor unit 304 is attached to ground support equipment 306. Wireless router 308, wireless router 310, router 312, and gateway 314 are located in or on a structure, such as terminal 316 in airport 302. The components are placed on rooftop 318 of terminal 316 to provide better coverage for wireless sensor units, such as wireless sensor unit 304. Further, by placing these components on rooftop 318, these components my not interfere with operations and equipment at airport 302.

As seen in this example, wireless sensor unit 304 may transmit operations data to wireless router 308. In turn, wireless router 308 routes the operations data to wireless router 310. From there, the operations data may be sent to wireless router 312, which sends the operations data to gateway 314. Gateway 314 may then transmit the data to a remote computer for processing. Gateway 314 also may be a wireless gateway in which the operations data is transported to the network through a wireless communications link. In some advantageous embodiments, gateway 314 may provide a wired link or connection to the network.

In addition to the locations illustrated on rooftop 318, wireless routers and/or gateways may be positioned in any location around a facility to provide wireless communication coverage over locations that support vehicles may commonly operate. These different components may be located on other structures in addition to or in place of terminal 316. For example, wireless routers and gateways may be located in other locations, such as jet way rooftops, light poles, near ground support equipment fueling stations, and other suitable locations.

Figure 4:
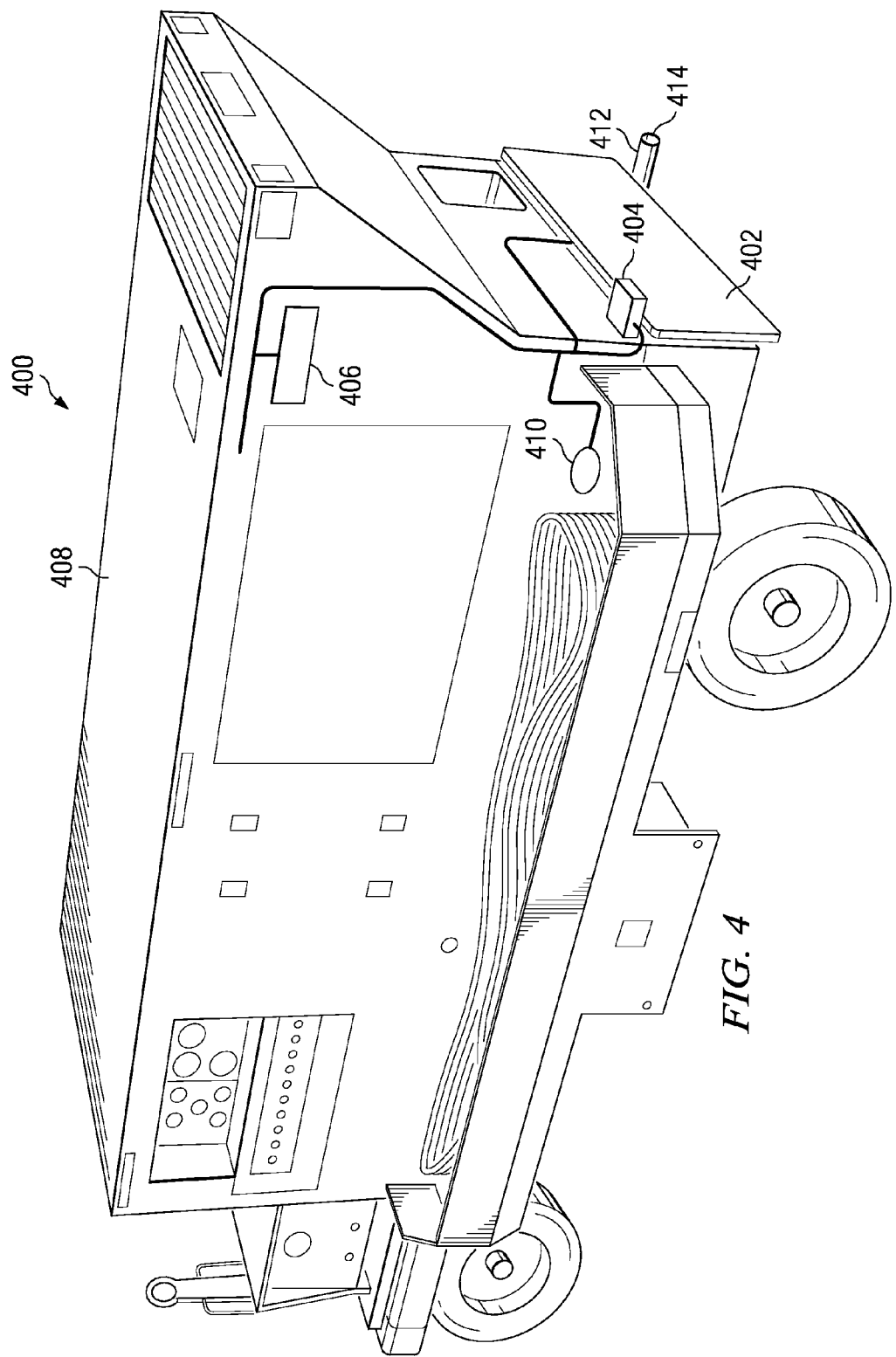
FIG. 4 is a diagram illustrating a wireless sensor unit on a support vehicle in accordance with an advantageous embodiment.

With reference now to FIG. 4, a diagram illustrating a wireless sensor unit on a support vehicle is depicted in accordance with an advantageous embodiment. In this example, ground support equipment 400 is an example of ground support equipment 117 in FIG. 1 on which wireless sensor unit 402 may be located. Wireless sensor unit 402 includes housing 404 in which various electronics for wireless sensor unit 402 are present. Additionally, in this example, energy harvesting device 406 is located on surface 408 of ground support equipment 400.

In these examples, wireless sensor unit 304 collects data and associates data with time stamps. Typically, operations wireless sensor unit 304 may store data for periods of time such as, for example, hours or days before transmitting the data to a router. The operations data then moves through the router and may be collected at gateway 238. The operations data may be stored at gateway 238 for some periods of time before reporting it or sending the data for further processing.

In other advantageous embodiments, in these examples, operations data may move in a real time manner. In these examples, "real time" means that the operation data is moved as quickly as possible as opposed to holding the operations data and sending it at different periods of time when the operations data could be sent earlier.

Energy harvesting device 406, in this example, takes the form of one or more solar cells. Of course, in other advantageous embodiments, other types of energy harvesting devices may be used. For example, energy harvesting device 406 may be, for example, without limitation, a vibration harvesting device, a thermal electrical device, or some other energy harvesting device.

As a vibration harvesting device, electrical power may be generated when exposed to vibrations, such as operational vibrations. When energy harvesting device 406 takes the form of a thermal electric device, electrical power may be generated when energy harvesting device 406 is exposed to thermal gradient. This thermal gradient may be, for example, a hot hydraulic line in ambient air or an exhaust pipe in ambient air.

Wireless sensor unit 402 also includes sensors, which are connected to housing 404. In this example, these sensors include current sensor 410 and temperature sensor 412. Current sensor 410 may be, for example, a current sensor and may clamp onto a wire in ground support equipment 400. Temperature sensor 412 may be, for example, a thermocouple and may be located in a stainless steel housing positioned in the exhaust pipe 414 for ground support equipment 400. Temperature sensor 412 also may be, for example, a thermistor and/or a bi-metal thermometer.

Figure 5:
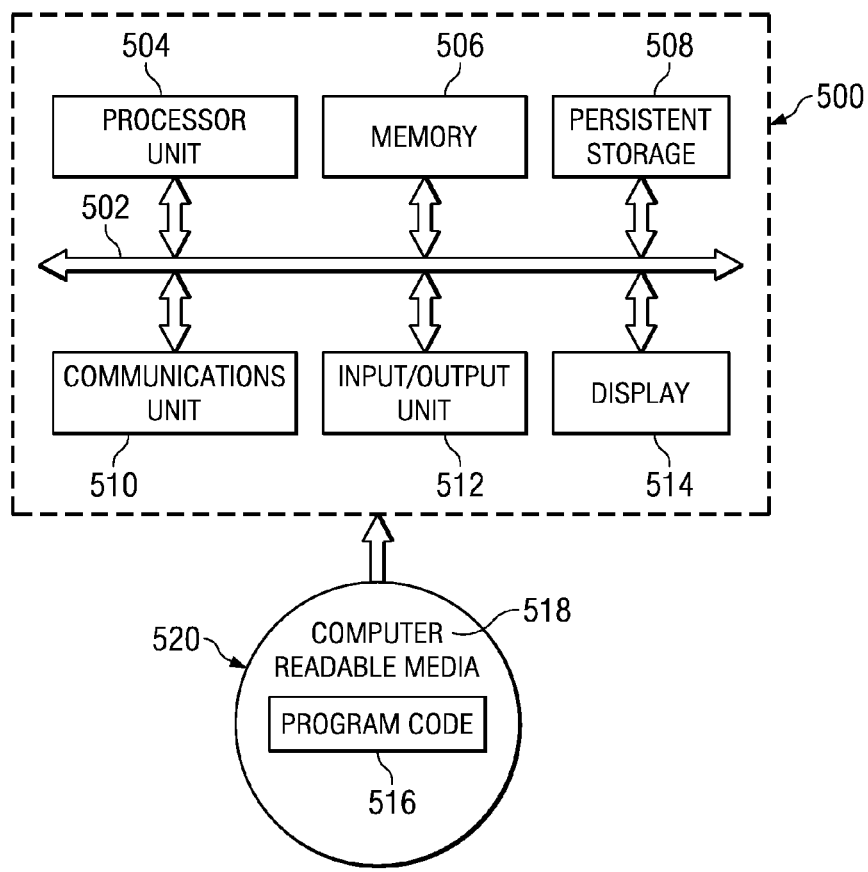
FIG. 5 is a diagram of a data processing system accordance with an advantageous embodiment of the present invention.

Turning now to FIG. 5, a diagram of a data processing system is depicted in accordance with an illustrative embodiment of the present invention. Data processing system 500 is an example of the data processing system that may be used to implement different components within operations monitoring system 100 in FIG. 1. For example, data processing system 500 may be used to implement computer 128 and/or gateways 114 in FIG. 1. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, a random access memory or any other suitable volatile or non-volatile storage device. Persistent storage 508 may take various forms depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508.

In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

Figure 6:
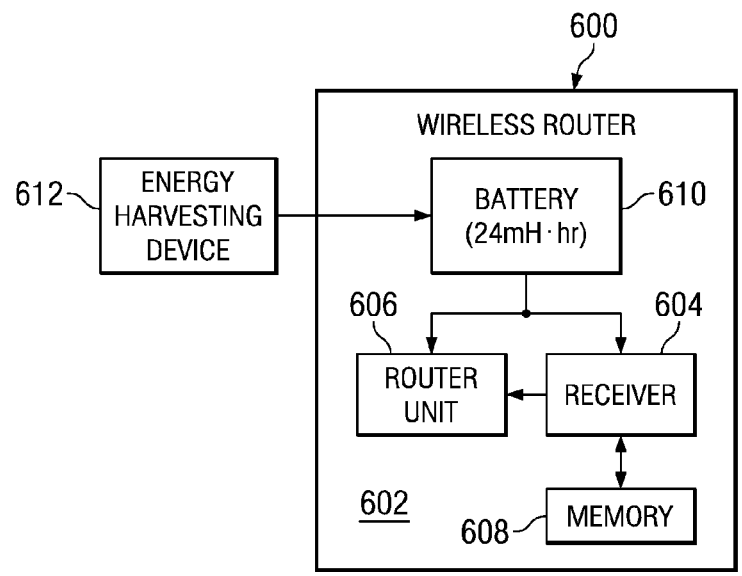
FIG. 6 is a block diagram of a router in accordance an advantageous embodiment.

With reference now to FIG. 6, a block diagram of a router is depicted in accordance with an advantageous embodiment. In this example, wireless router 600 is an example of a router in wireless routers 116 in FIG. 1. Wireless router 600 includes container 602, which provides a housing for components in wireless router 600. In this example, wireless router 600 also includes receiver 604, router unit 606, memory 608, battery 610, and energy harvesting device 612.

Container 602 may be, for example, a plastic container or some other suitable container to protect components of wireless router 600 from the elements. Container 602 may be sealed in some implementations.

Energy harvesting device 612 and battery 610 provide power to router unit 606, receiver 604, and memory 608. In these examples, energy harvesting device 612 generates and sends electrical current to charge and power battery 610. Energy harvesting device 612 in these examples may be, for example, a solar cell. Of course, other types of energy harvesting devices may be used in place of or in addition to energy harvesting device 612 depending on the particular implementation.

Receiver 604 may receive wireless transmissions from wireless sensor units located on support vehicles. The operations data in the wireless transmissions may be stored in memory 608 for transmission by router unit 606 to another router and/or gateway. Router unit 606 provides a capability to transmit operational data towards a gateway in the sensor network. When receiver 604 receives operations data, this information may be stored in memory 608. The storage of data in memory 608 may be temporary until router unit 606 is capable of routing the data to a gateway or another router.

In these examples, routers are powered by an energy harvesting device, which minimizes infrastructure complexity, installation time and costs. Alternatively, routers may be powered by other means, such as mains power, a primary battery, or a rechargeable battery that is remotely recharged or is recharged by an engine alternator.

Figure 7:
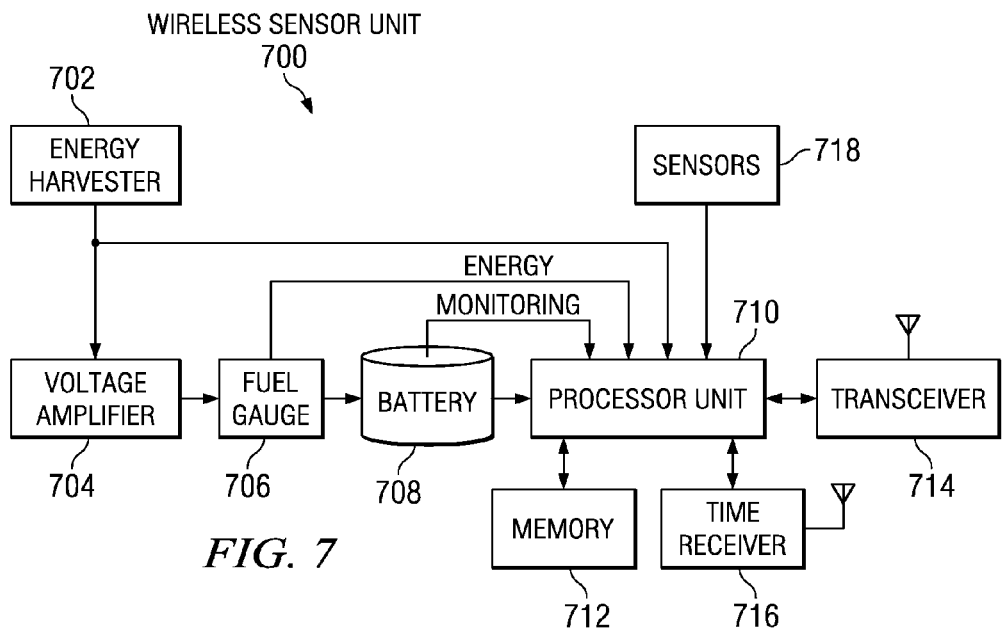
FIG. 7 is a diagram of a wireless sensor unit in accordance an advantageous embodiment.

With reference now to FIG. 7, a diagram of a wireless sensor unit is depicted in accordance with an advantageous embodiment. In this example, wireless sensor unit 700 is an example of a wireless sensor unit within wireless sensor units 118 in FIG. 1. As illustrated, wireless sensor unit 700 includes energy harvester 702, DC-to-DC converter 704, battery fuel gauge 706, battery 708, processor unit 710, memory 712, transceiver 714, time receiver 716, and sensors 718.

Energy harvester 702 may be, for example, a solar cell and provides energy to charge battery 708. DC-to-DC converter 704 may boost or buck the current and/or voltage generated by energy harvester 702. Battery fuel gauge 706 provides processor unit 710 a capability of identifying the state of charge present in battery 708. Further, processor unit 710 may monitor battery 708 to obtain statistics as to power usage. Memory 712 stores operations data detected by sensors 718.

Sensors 718 may include, for example, a current sensor, a thermocouple, and a thermistor. The current sensor may be used to identify electrical current usage in the support vehicle. The thermistor may be used to detect ambient air temperature. The thermocouple may be used to detect the temperature in an exhaust pipe. With this type of implementation, engine power may be estimated using information about the exhaust temperature of the vehicle. From engine power, exhaust may be identified. The exhaust temperature and the rate of change of exhaust temperature may be used to identify engine power. From engine power, an identification of emissions may be identified.

In other advantageous embodiments, sensors 718 may include a NOx sensor. A NOx sensor may be a high temperature device designed to detect nitrogen oxides in combustion environments, such as in an exhaust of a vehicle. Nitrogen oxide sensors may be available from Siemens VDO/NGK. This type of sensor is an example of one type of sensor that may be used to directly detect emissions from a vehicle. Of course, sensors 718 in different advantageous embodiments may include other types of sensors in place of or in addition to the ones described in this example.

Transceiver 714 transmits operations data stored in memory 712 to a router. Time receiver 716 is used to obtain the current time. The current time may be obtained through a signal transmitted from locations, such as, for example, WWVB (Fort Collins, Colo.), DCF77 (Germany), JJY (Japan), MSF (Britan) and HBG (Switzerland). This time information may be used to provide time stamps for the operations data. Further, sensor 718 also may include, for example, a global positioning receiver to obtain location and/or time information for the sensor.

Wireless sensor unit 700 may provide the ability to wake up on demand. In other words, many of the components in wireless sensor unit 700 may be shut down with transceiver 714 waking up the rest of the system when incoming transmissions are detected.

In these examples, processor unit 710 may be one or more processors. Processor unit 710 in this particular example may be implemented using a micro controller from Texas Instruments. In particular, a MSP430 micro controller from Texas Instruments, Inc. may be used. Memory 712 in these examples may be implemented using a flash memory. In particular, the flash memory may be a four megabyte flash memory. Of course, other types of memory and other sizes of memory may be used for memory 712 depending on the particular implementation.

In this example, transceiver 714 may be implemented using a CC2500RTK transceiver chip, which is available from Texas Instruments, Inc. Time receiver 716 may be implemented using a CME800 analog/digital receiver integrated circuit, which is available from C-MAX Time Solutions GmbH.

The wireless sensor unit 700 depicted in FIG. 7 is shown using an energy harvesting device and a battery as a power source, which may allow rapid installation of the sensor with minimal modification to existing vehicle systems. However, the wireless sensor unit 700 may instead be powered by any battery or power supply already on-board the vehicle, such as an engine start battery.

Figure 8:
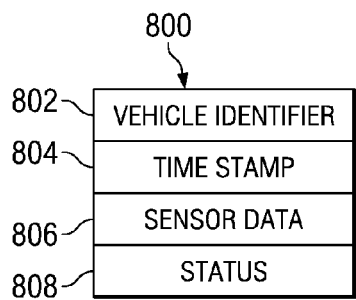
FIG. 8 is a diagram illustrating an example of operations data in accordance with an advantageous embodiment.

With reference now to FIG. 8, a diagram illustrating an example of operations data is depicted in accordance with an advantageous embodiment. In this example, message 800 is an example of a message that may be used to transmit operations data. As depicted, message 800 includes vehicle identifier 802, timestamp 804, sensor data 806, and status 808.

In the illustrative examples, vehicle identifier 802 is a unique identifier used to identify the vehicle in which the sensor unit generating message 800 is located. Vehicle identifier 802 may take various forms. For example, this may be an identifier that is unique within a facility or unique within an entire monitoring system. Vehicle identifier 802 may be, for example, a media access control address for a processor in a sensor unit, an identifier assigned by the monitoring system, a serial number or other identifier for the vehicle itself, or some other suitable identifier.

Timestamp 804 identifies the time when sensor data 806 was detected. Sensor data 806 is data for physical quantities detected by sensors in the wireless sensor unit. Status 808 may be the status of a wireless sensor unit. Status 808 includes an identification of the health or condition of the wireless sensor unit, such as condition of the battery, energy harvester, memory, or time receiver. In these different advantageous embodiments, operations data may be sensor data 806 alone or may include other data within message 800.

Further, the illustration of message 800 is only provided as one example of the manner in which operations data may be packaged and/or transmitted. Of course, in other implementations, message 800 may take other forms and may include other fields in addition to or in place of the ones illustrated in message 800. For example, message 800 also may include information identifying a path of routers used to route the data, an identification of the facility, and other suitable information.

Figure 9:
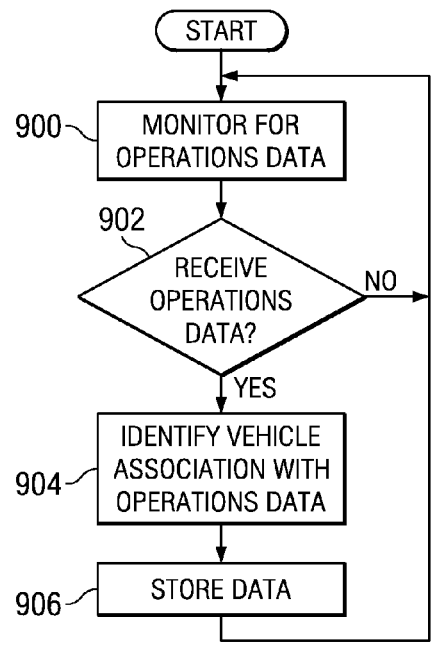
FIG. 9 is a flowchart of a process for monitoring for operations data in accordance with an advantageous embodiment.

With reference now to FIG. 9, a flowchart of a process for monitoring of operations data is depicted in accordance with an advantageous embodiment. The process illustrated in FIG. 9 may be implemented in an operations monitoring system, such as operations monitoring system 100 in FIG. 1. In particular, this process may be implemented in a component, such as computer 128 in FIG. 1.

The process begins by monitoring for operations data (operation 900). A determination is made as to whether operations data has been received (operation 902). In these examples, the data may be received from gateways 114 in FIG. 1. If operations data has not been received, the process returns to operation 900. Otherwise, the vehicle associated with the operations data is identified (operation 904). This identification may be made through a unique identifier located in the message containing the operations data. The process then stores the operations data (operation 906). Operation 906 may store this data in the database for analysis. In this example, the monitoring system waits for data to be sent by the gateways. In other advantageous embodiments, the monitoring system may actively establish communications with the gateway and request the data.

Figure 10:
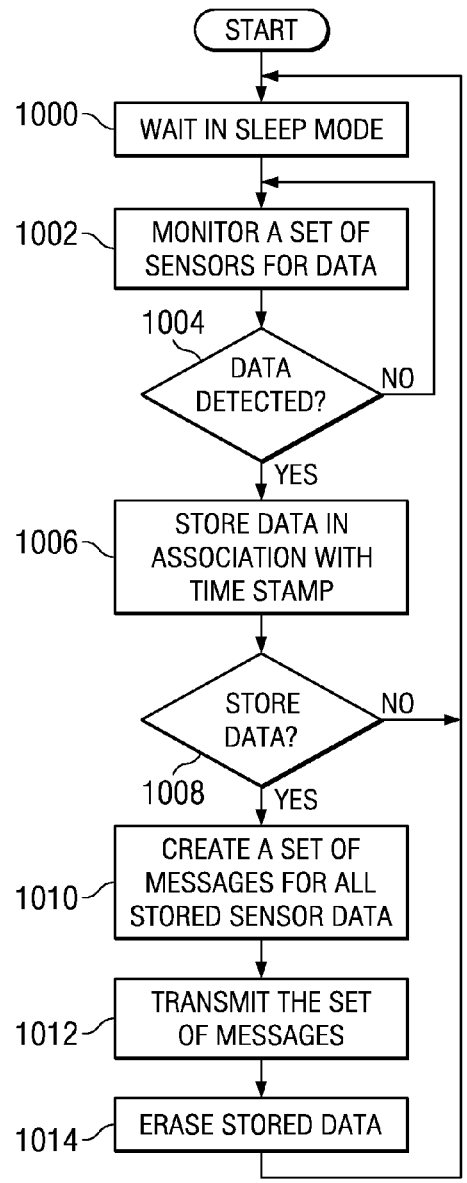
FIG. 10 is a flowchart of a process for collecting operations data in a wireless sensor unit in accordance with an advantageous embodiment.

Turning to FIG. 10, a flowchart of a process for collecting operations data in a wireless sensor unit is depicted in accordance with an advantageous embodiment. In this example, the flowchart in FIG. 10 may be implemented in a wireless sensor unit, such as wireless sensor unit 700 in FIG. 7. In particular, this process may be implemented or executed by processor unit 710 in FIG. 7.

The process begins by waiting in a sleep mode (operation 1000). The wait time in the sleep mode in operation 1000 may have various time periods, depending on the particular implementation. For example, the sleep mode may be for twenty seconds, one minute, or ten minutes.

During the sleep mode, power usage may be reduced by shutting down various components that may not be needed. Thereafter, the process monitors a set of sensors for data (operation 1002). A determination is made as to whether data has been detected (operation 1004). If data has not been detected, the process returns to operation 1002. Otherwise, the data is stored in association with the timestamp (operation 1006).

A determination is made as to whether the data should be sent (operation 1008). This determination may be made in other different ways depending on the particular implementation. For example, a determination may be made as to whether a connection can be established or is established with a wireless router.

In other advantageous embodiments, the determination may be whether some period of time has passed. For example, data may be sent every minute, every half hour, every five hours, every day, or once a week depending on the particular implementation. In other advantageous embodiments, this determination may be whether a particular event has occurred. The event may be a request from the monitoring system for data, whether the amount of data in the memory exceeds some threshold, or some other suitable event.

If data is not to be sent, the process returns to operation 1000. If data is to be sent, the set of messages is created for all the stored sensor data (operation 1010). These messages may take the form of a message, such as message 800 in FIG. 8. The process then transmits the set of messages (operation 1012). Thereafter, the process erases the stored data (operation 1014). In this manner, transmitted data may be removed to provide for more storage room for new data. Thereafter, the process returns to operation 1000 as described above.

Figure 11:
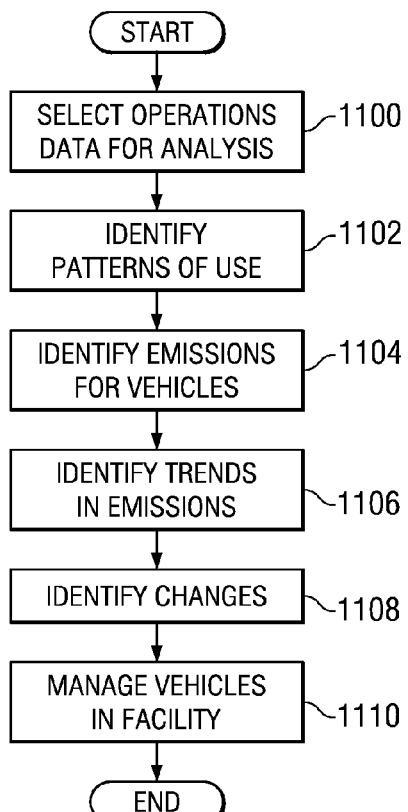
FIG. 11 is a flowchart of a process for managing a facility in accordance with an advantageous embodiment.

Turning now to FIG. 11, a flowchart of a process for managing a facility is depicted in accordance with an advantageous embodiment. The process illustrated in FIG. 11 may be implemented using operation monitoring system 100 in FIG. 1. These operations may include computer implemented steps, as well as human or user implemented steps.

The process begins by selecting operations data for analysis (operation 1100). This operations data may be for a single facility or multiple facilities. Further, the data may be for certain vehicles within a facility, a group or class of vehicles within a facility, or all of the vehicles. The process then identifies patterns of use (operation 1102). These patterns of use are for the different vehicles selected for operations data 1100.

The process then identifies emissions for the vehicles (operation 1104). With the patterns of use and emissions with the vehicles, trends in emissions are identified (operation 1106). These trends may be based on the comparison of the patterns with the emissions as well as the type of vehicles and maintenance histories for these vehicles. Of course, other information may be considered depending on the implementation. The trends in operation 1106 may be generated using various known statistical algorithms for analyzing data. Additionally, artificial intelligence and neural network systems also may be implemented to identify trends.

Based on the trends, changes in the operation of the vehicles inside the facility may be identified (operation 1106). These changes may include, for example, changes in the patterns of use, changes in maintenance schedules, changes in the selection or makeup of vehicles, changes in the facility infrastructure and other suitable changes. The vehicles in the facility are then managed using one or more of the identified changes (operation 1108), with the process terminating thereafter.

In the different advantageous embodiments, an identification of emissions may be made based on estimating the engine load factor. A load factor is a measurement of the amount of power generated by an engine on a scale between the least or zero amount of power and the maximum amount of power that can be generated by the engine.

For example, a load factor may be from 0 percent of the engine power to 100 percent of the engine power. In other advantageous embodiments, other scales may be used. For example, a scale of 0 may represent no engine power while a scale of 10 may represent the maximum engine power. Databases and tables are currently available for many vehicles in which these data sources provide an identification of exhaust based on engine load factor.

The different advantageous embodiments recognize that current processes for measuring engine load factors require modifications of systems in the vehicles or other types of fuel operated equipment. These changes may be expensive and time consuming. Further, some methods may interfere with the operation of fuel operated equipment or cause the equipment owner or operator to be concerned about making these modifications. These current methods may measure parameters, such as manifold pressure as an indication of power to identify load factor.

Current methods include, for example, measuring vacuum pressure for gasoline engines and fuel pump activity. These types of methods may require modifications or alterations to the engine or exhaust system. The different advantageous embodiments provide a method and apparatus for measuring engine load factors by monitoring exhaust temperatures within the fuel operated equipment. The monitoring in the different advantageous embodiments may be less invasive and easier to perform as compared to currently available methods.

In the different advantageous embodiments, engine load factor may be estimated using a thermal time constant for the exhaust system and measuring the temperature and rate of change of temperature for the exhaust system. The thermal time constant is for a location in the exhaust system at which the temperature and rate of temperature change may be measured. This type of measurement method requires less intrusion and/or modification of fuel operated equipment.

Figure 12:
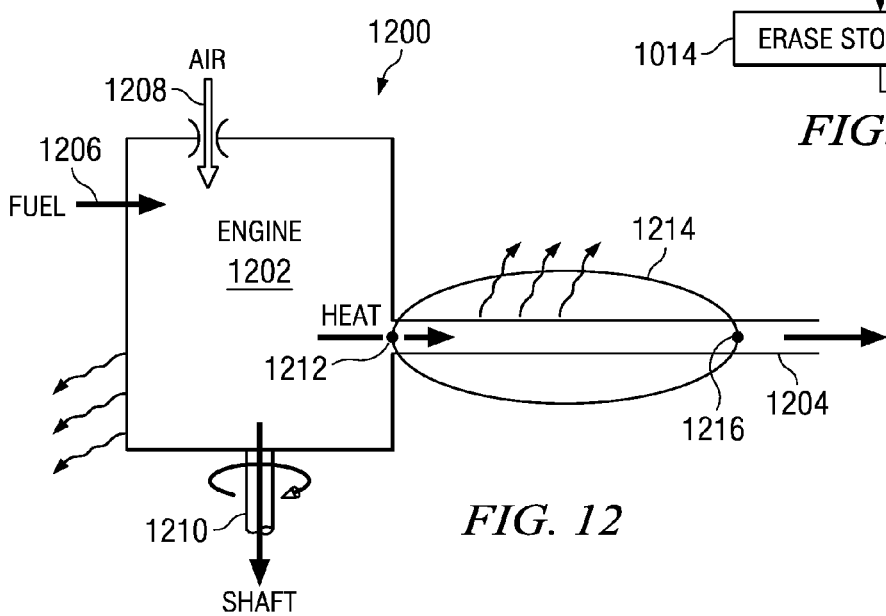
FIG. 12 is a diagram illustrating locations for taking measurements in an engine system in accordance with an advantageous embodiment.

Turning to FIG. 12, a diagram illustrating locations for taking measurements in an engine system is depicted in accordance with an advantageous embodiment. In this example, engine system 1200 includes engine 1202 and exhaust system 1204. Engine 1202 may use fuel 1206 and air 1208 at an ambient temperature to turn shaft 1210. In turning shaft 1210, engine 1202 generates heat that may be exhausted from the engine at least partially through exhaust system 1204. This exhaust heat is located at point 1212 in these examples. Heat also may be lost by an engine through a cooling system in these examples.

Section 1214 represents a lumped thermal capacitance region in which temperatures may be taken to identify a load factor of engine 1202. In these examples, these measurements may be taken using a sensor such as, for example, sensor 1216.

In these examples, the heat exhausted into exhaust system 1204 may be roughly proportional to the power generated by engine 1202. As heat flows into exhaust system 1204, some of the heat may dissipate in ambient surroundings along exhaust system 1204. The heat that may dissipate may vary depending on the ambient air temperature and the heat exhausted into exhaust system 1204.

The temperature measured by sensor 1216 may rise and fall as the heat exhausted into exhaust system 1204 rises and falls. A response time lag, however, may occur, which is caused by the length of exhaust system 1204 and the lumped capacitance of exhaust system 1204. The different advantageous embodiments take these factors into account to identify the heat exhausted from the engine at point 1212. In these examples, sensor 1216 may be located within or on exhaust system 1204.

In these examples, when a steady state condition is present, the difference between the temperature at sensor 1216, $T_{sensor,ss}$, and the temperature of air 1208, $T_{amb}$, is proportional to the temperature of the heat exhausted at point 1212. As a result, since the heat exhausted from the engine is roughly proportional engine power, the engine power may be identified as being roughly proportional to the difference between these two temperatures ($T_{sensor,ss}-T_{amb}$). Thus, with the thermal dynamic concept of lumped capacitance, an estimate at any moment in time of the temperature at sensor 1216 may be identified if that sensor were allowed to reach a steady state temperature.

Figure 13:
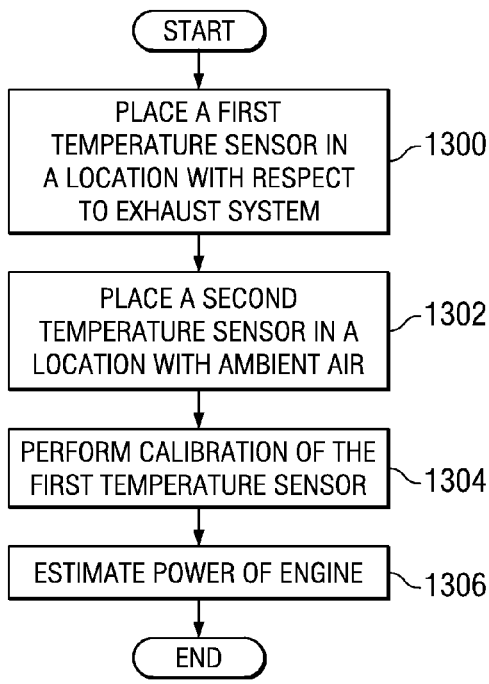
FIG. 13 is a flowchart of a process for estimating engine power through monitoring exhaust system temperatures in accordance with an advantageous embodiment.

With reference now to FIG. 13, a flowchart of a process for estimating engine loads through monitoring exhaust system temperatures is depicted in accordance with an advantageous embodiment. The process illustrated in FIG. 13 may be implemented in operations monitoring system 100 in FIG. 1.

The process begins by placing a first temperature sensor in a location with respect to the exhaust system (operation 1300). In some advantageous embodiments, in placing the first temperature sensor in a location with respect to the exhaust system, the temperature sensor may be placed in or on the exhaust system. The particular location selected is one in which the temperature sensor is capable of measuring temperature generated by the exhaust system. This sensor may be sensor 1216 in FIG. 12.

A second temperature sensor is placed in a location with exposure to ambient air (operation 1302). The measurement of ambient air using the second temperature sensor may be used to take in to account changes in the ambient environment around the engine and exhaust system. Changes in ambient air temperature conditions may be a source of air for the engine combustion and also may be the heat sink to which the exhaust system is transferring heat. The ambient air temperature may cancel out in many of the different calculations.

The process then performs a calibration of the first temperature sensor (operation 1304). This calibration involves identifying a thermal time constant for the particular location of the first temperature sensor in the exhaust system. The process for calibrating the temperature sensors is described in more detail in FIG. 14 below.

After calibration has been performed, the load factor of the engine may be estimated (operation 1306) with the process terminating thereafter. The estimation of engine load factor is described in more detail in FIG. 15 below. In operation 1306, the load factor may be estimated for different times based on the temperature measured by the first sensor to obtain the temperature of the exhaust and the rate of change in temperature of the exhaust.

In other words, the temperature of the exhaust may be hotter or cooler than its eventual steady state temperature. The different advantageous embodiments provide a capability to identify this difference at any moment in time. This capability allows the steady state temperature to be more accurately estimated at a particular point in time for a location in or on the exhaust system.

Figure 14:
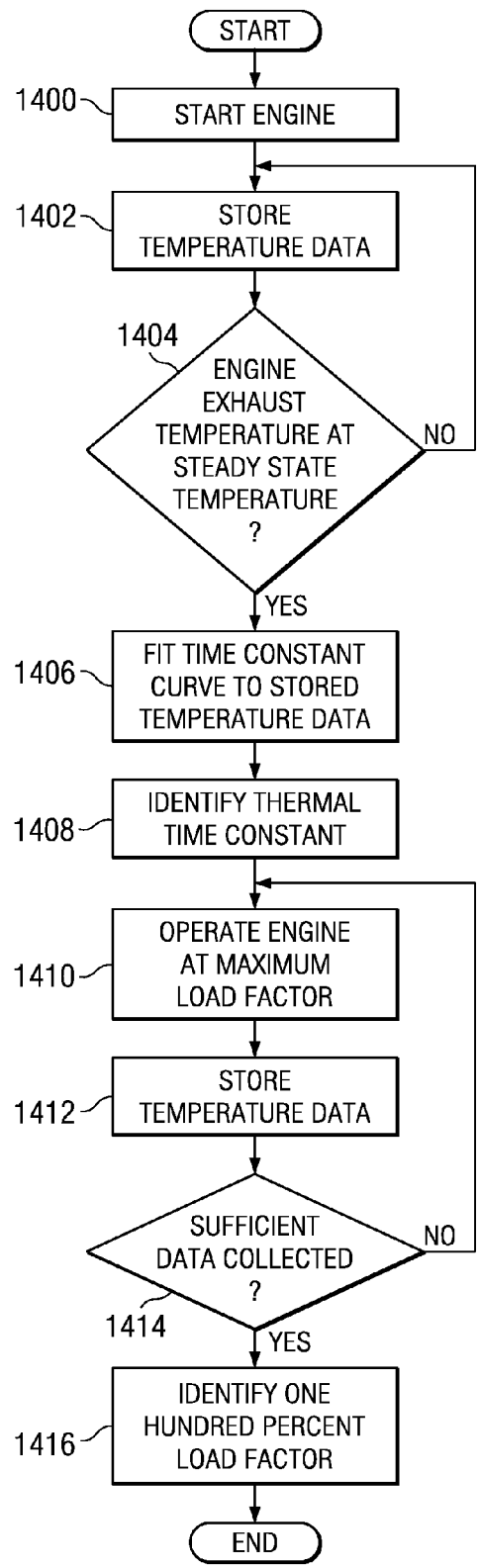
FIG. 14 is a flowchart of a process for calibrating a temperature sensor in accordance with an advantageous embodiment.

With reference now to FIG. 14, a flowchart of a process for calibrating a temperature sensor is depicted in accordance with an advantageous embodiment. In this example, FIG. 14 is a more detailed illustration of operation 1304 in FIG. 13.

In calibrating a temperature sensor, it is assumed that a temperature at a given location in or on the exhaust system may vary with engine load, ambient temperature and time. An assumption is also made that for a given engine load, a steady state temperature rise above the ambient temperature is eventually reached in or on the exhaust system. This steady state temperature rise above ambient temperature is assumed to be proportional to the engine load. As a result, a temperature sensor in a location with respect to the exhaust system may register or detect one value for the temperature in the exhaust. If the engine power factor changes at that point in time, the temperature of the exhaust system and of the sensor may require some period of time to register the new corresponding steady state temperature value. This period of time is the lag in these examples. In these examples, the lag is the time for the exhaust system at the sensor location to respond to a new amount of power or power factor generated by the engine.

The different advantageous embodiments employ a thermal concept of "lumped capacitance" used to predict the temperature of the exhaust at the sensor location. From the lumped capacitance method, the temperature at a point within a body exposed to a new environment may change with time according to the following:

$$\frac{dT}{dt} = \frac{(T - T_\infty)}{\tau} \quad \text{Equation 1}$$

$$\frac{(T - T_\infty)}{(T_i - T_\infty)} = e^{\left(\frac{-t}{\tau}\right)} \quad \text{Equation 2}$$

Where T is the temperature at time t, $T_\infty$ is the final steady state temperature, and $T_i$ is the initial temperature before exposure to the new environment.

The new environment indicates a change in the exhaust flow that may occur. The initial temperature before exposure to the new environment is the temperature measured by the exhaust at one moment in time. $T_\infty$ is the steady state of the temperature after the engine has been running at idle for sufficient time to approach steady state. $\tau$ is the thermal time constant. $\tau$ may be identified as follows:

$$\tau = R_t C_t$$

The system thermal time constant is equal $R_t C_t$, where $R_t$ is the system lumped thermal resistance to convection heat transfer and $C_t$ is the system lumped thermal capacitance.

Solving equation 2 for various values results in the following:

$$\tau = \frac{t}{\ln\left(\frac{T_i - T_\infty}{T - T_\infty}\right)} \quad \text{Equation 3}$$

$$T_\infty = \frac{T - T_i e^{(-t/\tau)}}{1 - e^{(-t/\tau)}}$$

$$T = T_\infty + (T_i - T_\infty)e^{(-t/\tau)} \quad \text{Equation 4}$$

The time constant $\tau$ may be system specific in these examples and may be fairly stable over a variety of engine run conditions and ambient temperatures. As a result, an idle to warm up procedure may be all that is needed to calculate the time constant $\tau$ for a given exhaust system of the fuel operated equipment.

Additionally, from equation 1, the following may be obtained;

$$T_\infty = T - \tau \frac{dT}{dt} \quad \text{Equation 5}$$

As can be seen in equation 5, the ambient temperature represented by $T_\infty$ is the eventual steady state temperature of the exhaust system at the sensor. T is the temperature that is measured and dT/dt is the rate of change of the temperature. For example, if two temperature readings are taken at 0.5 seconds apart, the temperature T is the average of those two readings. The rate of change is the difference between the two readings divided by 0.5 to obtain the rate of change. Equation 5 may then be used to obtain the steady state temperature. Equation 5 may be rewritten as follows:

$$T_{sensor,ss} = T_{sensor} - \tau \frac{dT_{sensor}}{dt} \quad \text{Equation 6}$$

In equation 6, $T_{sensor,ss}$ is the temperature of the sensor when it reaches steady state, $T_{sensor}$ is the temperature actually measured by the sensor, and $dT_{sensor}$ is the rate of change of the temperature for the sensor. In other words, equation 6 allows an identification of the steady state temperature that the temperature sensor would eventually reach if nothing else changed from the engine running conditions at the moment of time when a particular temperature is detected by the sensor. In this example, the sensor may be, for example, sensor 1216 in FIG. 12.

With reference still to FIG. 14, the process begins by starting the engine (operation 1400). Temperature data from the temperature sensor is stored (operation 1402). A determination is made as to whether the exhaust temperature sensor has approached a steady state temperature (operation 1404). This determination may be made in a number of different ways. For example, the engine may be allowed to run until the exhaust temperature sensor does not increase more than a specified amount after some selected period of time.

If the temperature is not at this steady state temperature, the process returns to operation 1402 to store temperature data. When the exhaust temperature sensor finally approaches the steady state temperature, the process then fits a time constant curve to the stored temperature data (operation 1406).

The process then identifies the thermal time constant from the curve (operation 1408). This thermal time constant may be used with measured temperatures and rates of change of temperature to estimate the engine load factor. The stored temperature data provides temperatures over different periods of time. This temperature data may be associated with time based on time stamps. The time constant may be fit to a curve through empirical processes using different values in equation 4 until the curve fits the data. Of course, other curve fitting methods also may be used depending on the particular implementation.

Next, the process operates the engine at a maximum load factor (operation 1410). In operation 1410, the engine is operated at its maximum power or capability. In other words, the engine may be operated at 100 percent of its capable power. The temperature data is stored while operating the engine at this load factor (operation 1412). A determination is then made as to whether sufficient temperature data has been collected to estimate the steady state temperature corresponding to a 100 percent load factor for the engine (operation 1414). If insufficient data has been collected, the process returns to operation 1410.

If sufficient data has been collected, the process then identifies the steady state temperature corresponding to the 100 percent load factor for the engine from the temperature data stored while operating the engine at the maximum load factor (operation 1416), with the process terminating thereafter. The data stored when operating the engine at the maximum load factor may be used to extrapolate the steady state temperature at the sensor when the load factor is 100 percent. This temperature is calculated as $T_{sensor,ss100\%}$. Note that $T_{sensor,ss100\%} - T_{amb}$, where $T_{sensor,ss100\%}$ is the temperature at steady state with 100 percent load factor and $T_{amb}$ is the ambient air temperature corresponds to 100 percent load factor and may then be used to identify the load factor for other percent levels of power for stead state temperatures.

Figure 15:
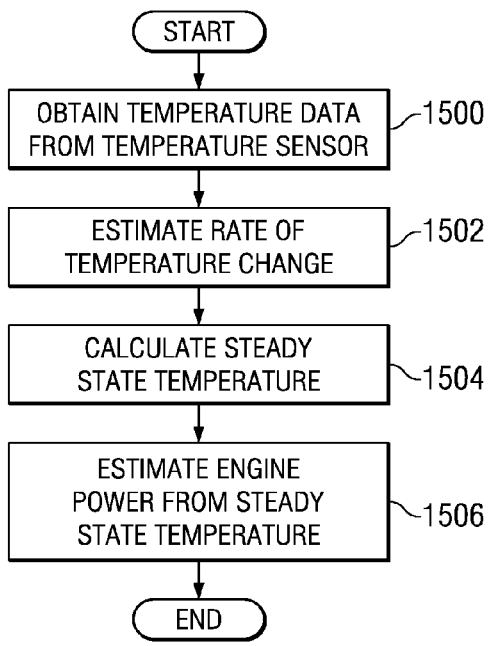
FIG. 15 is a flowchart of a process for estimating power of an engine in accordance with an advantageous embodiment.

With reference now to FIG. 15, a flowchart of a process for estimating load factor of an engine is depicted in accordance with an advantageous embodiment. The process illustrated in FIG. 15 is a more detailed description of operation 1306 in FIG. 13.

The process begins by obtaining temperature data from the temperature sensor (operation 1500). In these examples, the temperature sensor is the temperature sensor that is placed in a location with respect to the exhaust system. This temperature sensor is used to measure the temperature in or on an exhaust system at a point at or downstream of the engine.

The process then estimates the rate of change of the temperature (operation 1502). This change may be estimated by comparing the current temperature with previous values. The process then calculates the steady state temperature (operation 1504). This calculation may be made using equation 6 as shown above.

Next, the engine load factor is estimated from the steady state temperature (operation 1506) with the process terminating thereafter. In operation 1506, engine load factor may be estimated in a number of different ways.

In this example, the power level at the moment in time for a particular steady state temperature identified in step 1504 may be calculated as follows:

$$P \propto T_{sensor,ss} - T_{amb} = T_{sensor} - \tau \frac{dT_{sensor}}{dt} - T_{amb} \quad \text{Equation 7}$$

where P is equal to power, $T_{sensor,ss}$ is the steady state temperature at the sensor, $T_{amb}$ is the ambient temperature, $T_{sensor}$ is the temperature measured by the sensor, $\tau$ is the thermal time constant, $dT_{sensor}/dt$ is the change in temperature over time, also referred to as the rate of temperature change. From identifying the power, a load factor for the engine at a moment in time may be estimated as follows:

$$LF = \frac{P}{P_{100\%}} \quad \text{Equation 8}$$
$$= \frac{T_{sensor,ss} - T_{amb}}{T_{sensor,ss,100\%} - T_{amb}}$$
$$= \frac{T_{sensor} - \tau \frac{dT_{sensor}}{dt} - T_{amb}}{T_{sensor,ss,100\%} - T_{amb}}$$

In this equation, LF is the load factor, $P_{100\%}$ is 100 percent power, and $T_{sensor,ss,100\%}$ is when the engine is operating at a 100 percent load factor. In this example, the estimated engine power P may be calculated from the load factor by multiplying the load factor by the specified maximum power for the engine:

$$P = LF \cdot (\text{max rated power})$$

where P is equal to power, LF is the load factor, and max rated power is the maximum power specified for the engine.

As an alternate method for determining $(T_{sensor,ss,100\%} - T_{amb})$, the GSE may be operated over a long period of time with the maximum $(T_{sensor,ss} - T_{amb})$ detected assumed to $(T_{sensor,ss,100\%} - T_{amb})$. Alternatively, the engine or equipment manufacturer may specify the engine's idle load factor. This would allow calculation of $$(T_{sensor,ss,100\%} - T_{amb}) = \frac{(T_{sensor,ss,idle} - T_{amb})}{(P_{idle}/P_{max})} \quad \text{Equation 9}$$

Once the engine has been instrumented and calibrated, the exhaust temperature may be used at any later moment in time to estimate $(T_{sensor,ss} - T_{amb})$ using Equation 6. The corresponding engine load factor at that moment may be calculated as $$LF = \frac{T_{sensor,ss} - T_{amb}}{T_{sensor,ss,100\%} - T_{amb}} \quad \text{Equation 10}$$
$$= \frac{\left(T_{sensor} - \tau \frac{dT_{sensor}}{dt} - T_{amb}\right)}{T_{sensor,ss,100\%} - T_{amb}}$$

where $T_{sensor}$ and $(dT_{sensor}/dt)$ and $T_{amb}$ are now the only variables, which are easy to instrument and measure.

Another alternative involves collecting both $(T_{sensor,ss} - T_{amb})$ data and actual fuel utilization data over a period of time. Integrating $(T_{sensor,ss} - T_{amb})$ over a time period allows a calculation of a fuel burn rate as a function of $(T_{sensor,ss} - T_{amb})$ as follows:

$$(\text{TotalFuelBurn}) = \int c \cdot (T_{sensor,ss} - T_{amb}) dt \quad \text{Equation 11}$$

or $$\frac{d(\text{fuel})}{dt} = c \cdot (T_{sensor,ss} - T_{amb})$$

where c is a conversion constant which may be determined by running the engine over a period of time, observing the actual fuel burned of that period of time and dividing by the area under the curve for $(T_{sensor,ss} - T_{amb})$ plotted over the same period of time.

Figure 16:
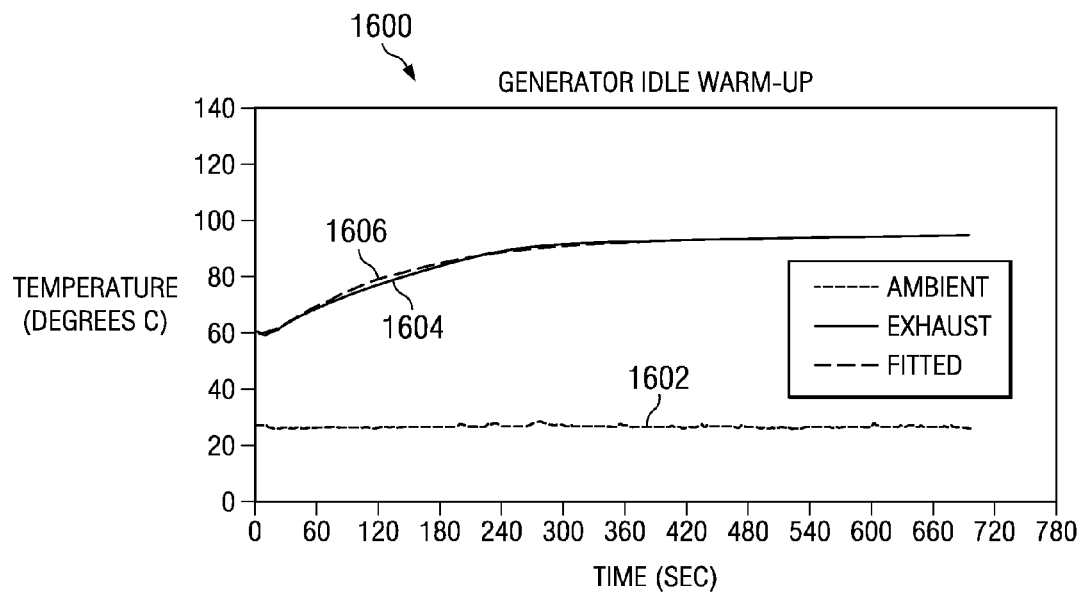
FIG. 16 is a diagram illustrating a curve fitted to temperature data in accordance with an advantageous embodiment.

With reference now to FIG. 16, a diagram illustrating a curve fitted to temperature data is depicted in accordance with an advantageous embodiment. Graph 1600 illustrates temperature in the Y axis and time in the X axis. Curve 1602 in graph 1600 represents the ambient temperature. Curve 1604 represents the measured temperature in the exhaust system and curve 1606 represents a fitted curve from which a time constant may be identified.

Figure 17:
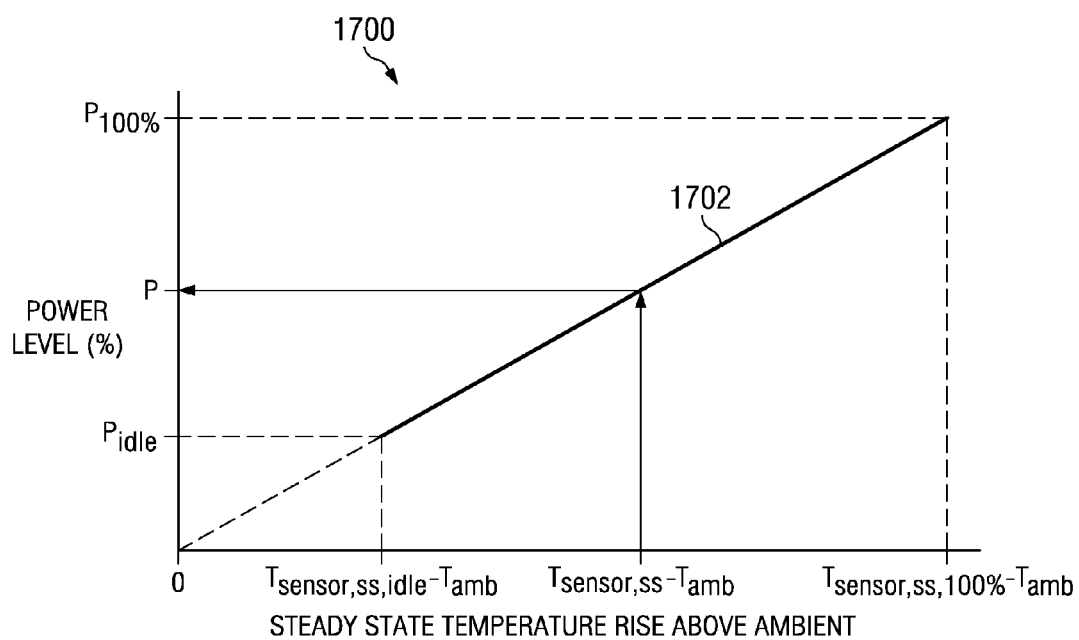
FIG. 17 is a diagram illustrating a graph used to obtain power levels in accordance with an advantageous embodiment.

With reference now to FIG. 17, a diagram illustrating a graph used to obtain power levels is depicted in accordance with an advantageous embodiment. Points on graph 1700 may be derived from data obtained in FIG. 14. In particular, the data in FIG. 14 may be used to identify the temperature of the sensor at steady state when the engine is at 100 percent load factor. The ambient temperature may be subtracted from this temperature to identify 100 percent load factor for use in generating graph 1700. Similarly, the data in FIG. 14 may be used to identify the temperature at the sensor at steady state when the engine is at idle load factor. In graph 1700, a percent power level is represented on the Y axis while the steady state temperature rise above ambient is represented on the X axis. This percent power level is a representation of the load factor for the engine. The percent power level may be identified from the steady state temperature using the curve 1702.

In this manner, the different advantageous embodiments provide a method and apparatus for monitoring vehicle emissions. These vehicles emissions may be monitored for one or more facilities and may involve using a set of wireless gateways, wireless sensor units, wireless routers, and a data processing system. The wireless sensor units are capable or monitoring operations of the vehicles.

These operations may include the generation of emissions. This data is routed through the wireless routers to a gateway. The gateway then sends the operations data to a data processing system which is capable of processing this emissions data. The process in these examples may include identifying operational use patterns and/or emissions generated by the vehicles as a group. Further, trends and information used to manage the facility also may be generated.

Additionally in some advantageous embodiments, the engine load factor may be estimated based on the exhaust temperatures measured in the exhaust system. This information along with the thermal time constant, the rate of change of temperature in the exhaust system and ambient air temperature may be used to estimate the engine load factor. In the engine load factor, the correlation or estimate may be made of the exhaust generated by the engine.

Further, it is recognized that the depicted method for estimating engine load factor from exhaust temperatures is an approximate method. For example, no consideration is made for the flow rate of ambient air over the exhaust system from wind or vehicle motion, which may have an impact on the estimate of load factor. Further, the relationship between steady state exhaust temperature rise and power level, as depicted in FIG. 17, may not be linear. Still further, sophisticated engines may operate in various modes including, for example, re-circulating some of the exhaust gases through the engine to speed its warm-up cycle, which may alter the relationships between steady state temperature and load factor.

However, one or more of these factors may be corrected through additional data obtained from the equipment specifications in the different advantageous embodiments. Further, useful trends may still be revealed by observing the time history of the collected data, such as equipment operating patterns. Further, data accumulated over time may be correlated or normalized to more precisely collected data, such as total fuel use over a period of time as given by Equation 11. Still further, changes in operating patterns are likely to be observed from the data over time.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Although the illustrative embodiments are described with respect to monitoring emissions and vehicle/equipment operations, the advantageous embodiments may be applied to monitoring other things. For example, use patterns may be monitored and compared to maintenance performed on vehicles to identify ways to increase reliability or reduce needed maintenance for vehicles at a facility.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for estimating engine load factor, the method comprising:
   obtaining temperature data from a temperature sensor in a location with respect to an exhaust system for an engine;
   estimating a rate of temperature change using the temperature data;
   calculating a steady state temperature at a selected time for the location using the temperature data, the rate of temperature change, and a thermal time constant for the location as follows:

$$T_\infty = T - \tau \frac{dT}{dt}$$

wherein $T_\infty$ is a steady state temperature with respect to an exhaust system for an engine, T is a temperature from sensor data, $\tau$ is a thermal time constant, and dT/dt is a rate of change of the temperature T; and
   estimating the engine load factor at the selected time from the steady state temperature.

2. The method of claim 1 further comprising:
   placing the temperature sensor in the location with respect to the exhaust system; and
   performing a calibration of the temperature sensor prior to calculating the steady state temperature.

3. The method of claim 2, wherein the performing step comprises:
   measuring a temperature in the location using the temperature sensor to form the temperature data;
   determining whether the temperature has reached a steady state for a location with respect to an exhaust system for an engine;
   responsive to a determination that the temperature has reached the steady state, fitting a curve to the temperature data; and
   identifying a thermal time constant for the location from the curve.

4. The method of claim 1 further comprising:
   estimating exhaust generated by the engine from the engine load factor estimated at the selected time.

5. The method of claim 1, wherein the temperature sensor is a first temperature sensor and the temperature data is first temperature data and further comprising:
   obtaining second temperature data from a second temperature sensor in a second location with ambient air around the exhaust system; and
   adjusting the steady state temperature using the second temperature data.

6. The method of claim 1, wherein the engine is located in one of a fire truck, a shuttle bus, a fuel truck, a deicing vehicle, a push back tug, a catering vehicle, a cargo transport vehicle, a mobile air conditioning vehicle, a ground power cart, a fuel power work light, a generator, an aircraft, and a submarine.

7. The method of claim 1, wherein the temperature sensor is selected from one of a thermocouple, a thermistor, and a bi-metal thermometer.

8. The method of claim 1, wherein the location with respect to the exhaust system for the engine is selected from one of on the exhaust system and in the exhaust system.

9. A method for estimating engine load factor for an engine, the method comprising:
   obtaining temperature data for a location with respect to an exhaust system for the engine;
   estimating a rate of temperature change using the temperature data;
   calculating a steady state temperature at a selected time for the location using the temperature data, the rate of temperature change, and a thermal time constant for the location as follows:

$$T_\infty = T - \tau \frac{dT}{dt}$$

wherein $T_\infty$ is a steady state temperature with respect to an exhaust system for the engine, T is a temperature from sensor data, $\tau$ is a thermal time constant, and dT/dt is a rate of change of the temperature T; and
   estimating the engine load factor for the engine at the selected time from the steady state temperature.

10. The method of claim 9, wherein the obtaining step comprises:
    measuring temperatures from a temperature sensor in the location.

11. The method of claim 10, wherein the temperature sensor is a first temperature sensor and the temperature data is first temperature data and further comprising:
    obtaining second temperature data from a second temperature sensor in a second location with ambient air around the exhaust system; and
    adjusting the steady state temperature using the second temperature data.

12. An apparatus comprising:
    a temperature sensor capable of being placed in a location with respect to an exhaust system for an engine;
    a computer; and
    program code stored on the computer, wherein the computer executes the program code to obtain temperature data from the temperature sensor; estimate a rate of temperature change using the temperature data; calculate a steady state temperature at a selected time for the location using the temperature data, the rate of temperature change, and a thermal time constant for the location as follows:

$$T_\infty = T - \tau \frac{dT}{dt}$$

wherein $T_\infty$ is a steady state temperature at the location, T is a temperature from sensor data, $\tau$ is a thermal time constant, and dT/dt is a rate of change of the temperature T; and estimate engine load factor at the selected time from the steady state temperature.

13. The apparatus of claim 12 further comprising:
    the exhaust system.

14. The apparatus of claim 12, wherein the computer executes the program code to perform a calibration of the temperature sensor prior to calculating the steady state temperature.

15. The apparatus of claim 12, wherein the engine is located in one of a fire truck, a shuttle bus, a fuel truck, a deicing vehicle, a push back tug, a catering vehicle, a cargo transport vehicle, a mobile air conditioning vehicle, a ground power cart, a fuel power work light, a generator, an aircraft, and a submarine.

16. The apparatus of claim 12, wherein the temperature sensor is selected from one of a thermocouple, a thermistor, and a bi-metal thermometer.

* * * * *